(12) United States Patent
Karlsson

(10) Patent No.: US 11,108,843 B2
(45) Date of Patent: Aug. 31, 2021

(54) STREAMING USING CONSTRAINED DYNAMIC MULTI-HOP NETWORK

(71) Applicant: LumenRadio AB, Gothenburg (SE)

(72) Inventor: Michael Karlsson, Kode (SE)

(73) Assignee: LumenRadio AB, Gothenburg (SE)

( * ) Notice: Subject to any disclaimer, the term of this patent is extended or adjusted under 35 U.S.C. 154(b) by 0 days.

(21) Appl. No.: 16/609,394

(22) PCT Filed: Apr. 9, 2019

(86) PCT No.: PCT/EP2019/058944
§ 371 (c)(1),
(2) Date: Oct. 29, 2019

(87) PCT Pub. No.: WO2019/197398
PCT Pub. Date: Oct. 17, 2019

(65) Prior Publication Data
US 2021/0021661 A1    Jan. 21, 2021

Related U.S. Application Data

(60) Provisional application No. 62/654,531, filed on Apr. 9, 2018.

(51) Int. Cl.
*H04L 29/06* (2006.01)
*G06T 3/00* (2006.01)
(Continued)

(52) U.S. Cl.
CPC .......... *H04L 65/607* (2013.01); *G06T 3/0056* (2013.01); *G06T 3/4007* (2013.01);
(Continued)

(58) Field of Classification Search
CPC . H04L 65/607; H04L 65/4076; H04L 65/608; G10L 19/00; G06T 3/0056;
(Continued)

(56) References Cited

U.S. PATENT DOCUMENTS

| 6,704,357 B1* | 3/2004 | Ketcham | H04N 7/148 348/699 |
| 2007/0248047 A1* | 10/2007 | Shorty | H04L 12/2838 370/329 |

(Continued)

FOREIGN PATENT DOCUMENTS

EP    2437428 A1    4/2012

*Primary Examiner* — Michael A Keller
(74) *Attorney, Agent, or Firm* — Capitol City TechLaw

(57) ABSTRACT

A wireless mesh network and a method of reducing for reducing a sampling rate of a streaming protocol in a multi-hop mesh network is disclosed. The method comprising: receiving, by a source node in the mesh network, an input data stream; generating, by the source node, a plurality of sample frames from the received input data stream, each of the plurality of sample frames having a sample rate that can be handled by the mesh network, transmitting the plurality of the sample frames to one or more sink nodes and reconstructing the input data stream from the plurality of sample frames received at the one or more sink nodes. The input data stream may be received from an application outside the mesh network or from an application in the source node. The reconstruction may use interpolation, which may be dynamically varied, and may be informed by metadata transmitted from the original source node.

9 Claims, 5 Drawing Sheets

(51) Int. Cl.
*G06T 3/40* (2006.01)
*G10L 19/00* (2013.01)
*H04W 4/06* (2009.01)
*H04W 80/12* (2009.01)
*H04W 84/18* (2009.01)

(52) U.S. Cl.
CPC .......... *G10L 19/00* (2013.01); *H04L 65/4076* (2013.01); *H04L 65/608* (2013.01); *H04W 4/06* (2013.01); *H04W 80/12* (2013.01); *H04W 84/18* (2013.01)

(58) Field of Classification Search
CPC ...... G06T 3/4007; H04W 4/06; H04W 84/18; H04W 80/12
See application file for complete search history.

(56) References Cited

U.S. PATENT DOCUMENTS

| | | | | |
|---|---|---|---|---|
| 2016/0182690 A1* | 6/2016 | Akhter | ..................... | H04L 69/08 370/474 |
| 2017/0142602 A1* | 5/2017 | Otomo | .................. | H04W 24/04 |
| 2017/0347110 A1* | 11/2017 | Wang | ................... | G06K 9/6215 |

* cited by examiner

STREAMING USING CONSTRAINED DYNAMIC MULTI-HOP NETWORK

CROSS REFERENCE TO RELATED APPLICATIONS

This application claims priority under 35 USC 119(e) to U.S. Provisional Patent Application No. 62/654,531 filed Apr. 9, 2018, the entire content of which is incorporated herein by reference.

The present invention relates to data streaming using a dynamic multi-hop communication system and method, and more particularly to a system and a method for broadcast transmission of streaming protocols over wireless mesh networks. More specifically, the invention relates to a system and method for reducing sample rate of a streaming protocol for example lighting control at the data source (in the border of the network) and the reconstruction of said protocol (or similar protocol format) at the data sinks in wireless multi-hop networks.

BACKGROUND

A mesh network is a local network topology in which the infrastructure nodes connect directly, dynamically and non-hierarchically to as many other nodes as possible (based upon a number of factors including a communication mode exchanging information between nodes) and cooperate with one another to efficiently route data from/to clients. Each node may be a source or a sink.

Each node cooperates in the relaying of data or information in the network. A routing technique or a flooding technique refers to a design of how the mesh topology works in a network. The message from a source is relayed through a path by simply going through node after node until it reaches the matched sink. With the use of routing method all the nodes are ensured that it is available upon transmission even when some of the nodes are broken, this process is called the self-healing algorithm which reduces the need for the network engineers to troubleshoot issues regarding the data propagation.

Other topologies include a star network topology, a data or communication network in which all nodes are independently connected to one central unit. This topology requires more cable length than a linear topology. When the hub, switch, or concentrator fails, attached nodes are disabled. More expensive than linear bus topologies because of the cost of the intermediate devices (e.g. switches, routers, hubs, and the like). Another network topology is called a ring topology. It behaves in a way that transfers data from a source to a specified sink by circulating the whole network in a single direction until it reaches its designated location. However, this type of network topology may not work for a place that is composed of several peripherals. A node that is not functional may stop the process of the transmission.

Each network topology may have strengths and weaknesses as compared to other networks. When trying to stream data, a star or ring topology may have a greater data throughput than a mesh network because of the requirements that multiple intermediate nodes repeat received data sharing the media in the same collision domain. As the number of nodes in a mesh network are each flooding other nodes with the streaming data, the throughput capacity of the mesh network may be constrained and adversely affect a fidelity of the transmitted data.

There is consequently a need in the industry to provide mesh network over other network topologies as the mesh networks have advantageous features.

SUMMARY

The present invention has the objective of improving a streaming throughput capacity of a mesh network which provides advantages over known solutions and techniques in relation to the aforementioned or other aspects.

The invention is defined by the independent claims. Embodiments of the invention are defined by the dependent claims.

Disclosed is a system and method for improving an effective streaming throughput capacity of a mesh network. The following summary of the invention is provided to facilitate an understanding of some of the technical features related to a system and a method for reducing sample rate of a streaming protocol for control, for example lighting control, at the data source (in the border of the network) and the reconstruction of said protocol (or similar protocol format) at the data sinks in wireless multi-hop networks, and is not intended to be a full description of the present invention. A full appreciation of the various aspects of the invention can be gained by taking the entire specification, claims, drawings, and abstract as a whole. The present invention is applicable to other data streaming using other wireless multi-hop network topologies.

An embodiment of the present invention may include a communication of a full input data stream into a border router of a multi-hop network (e.g., a mesh), an intentional drop or production of a set of derived samples to produce a data transmission between nodes having a sample rate (amount of messages) that the network can handle; and interpolating or reconstructing or generating, responsive to the samples, in the sinks, end data to simulate, as closely as possible or necessary, the original full input data stream at each node of the network.

An embodiment of the present invention may employ an interpolation between sample or key frames. An embodiment may implement one or more different interpolations to simulate the original full input data stream.

An embodiment of the present invention may include an original node of a mesh-type network receiving an original input full data stream which creates, produces, or forms the lower data rate key data, may also determine which reconstruction/reproduction mechanism is a best or desired fit to restore or transform the key data to a desired end-user structure. This original node may communicate to other nodes sufficient information, such as by transmission of parametric data using the network or other out-of-channel mechanism, information to select and/or implement a preferred restoration (and appropriate variables for example) to produce the desired results in the sink(s).

In some embodiments, a particular selection of a best/desired fit restoration mechanism may depend on an analysis or parameterization of the input data stream. One example is linear interpolation.

An embodiment of the present invention may solve a basic problem relating to installation issues that may arise from traditional wireless DMX systems that employ a star network, that is streaming from one node to everyone that can hear it. This requires a lot of cell planning and makes installations complex and time consuming. In contrast, a mesh network may allow each wireless fixture to repeat the propagating data signal, creating great coverage, where line-of-sight and distance to the data source is of reduced concern if a concern at all. However when implanting DMX control using a mesh network, flooding of the mesh network where the network does not have bandwidth (due to data speed and the collision domain with multiple retransmissions of each packet). Therefore an embodiment of the present invention includes a DMX control implementation which streaming control information is sampled by a receiving node to produce key sample frames broadcast over the net, for reconstruction/recreation/interpolation of the control data stream at each addressed mesh sink node. And the receiving node may communicate reconstruction parameters/selection options to the sink node(s) to produce the desired result at the sink node(s).

An embodiment of the present invention is not required to desirably reproduce/reconstruct the received input data stream with 100% fidelity. In some cases, an embodiment may select a reconstruction option to purposefully adjust the reconstruction stream at a node in a manner that is different from the received data in a known variant. And different sinks may employ different reconstructions to produce different reconstructions at different nodes when necessary or desired.

Broadly, an embodiment of the present invention may include one or both of: a) reducing data (e.g., lowering sample rate/dropping frames) to address bandwidth limitation of data streaming in a mesh-type network; and b) interpolating, such as in the data sinks, between received sample or key frames to replicate the original stream.

In some embodiments, this interpolation may be performed using an appropriate interpolation approach, including use of a linear, a cubic spline, or any other interpolation formula. An embodiment may change dynamically which interpolation, simulation, or regeneration mechanism to employ depending on current needs, such as the interpolation/simulation/regeneration that currently fits best to input full data stream. This can be calculated by the data source (gateway) that receives the input data stream from the outside world and source it to the network since it knows the full look of the input data stream. This can be pattern matched to determine a best fitting solution, and transmit some metric, parameter data set, or other guiding features along with simulation data as meta data used in the interpolation, reconstruction, simulation, and/or regeneration.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
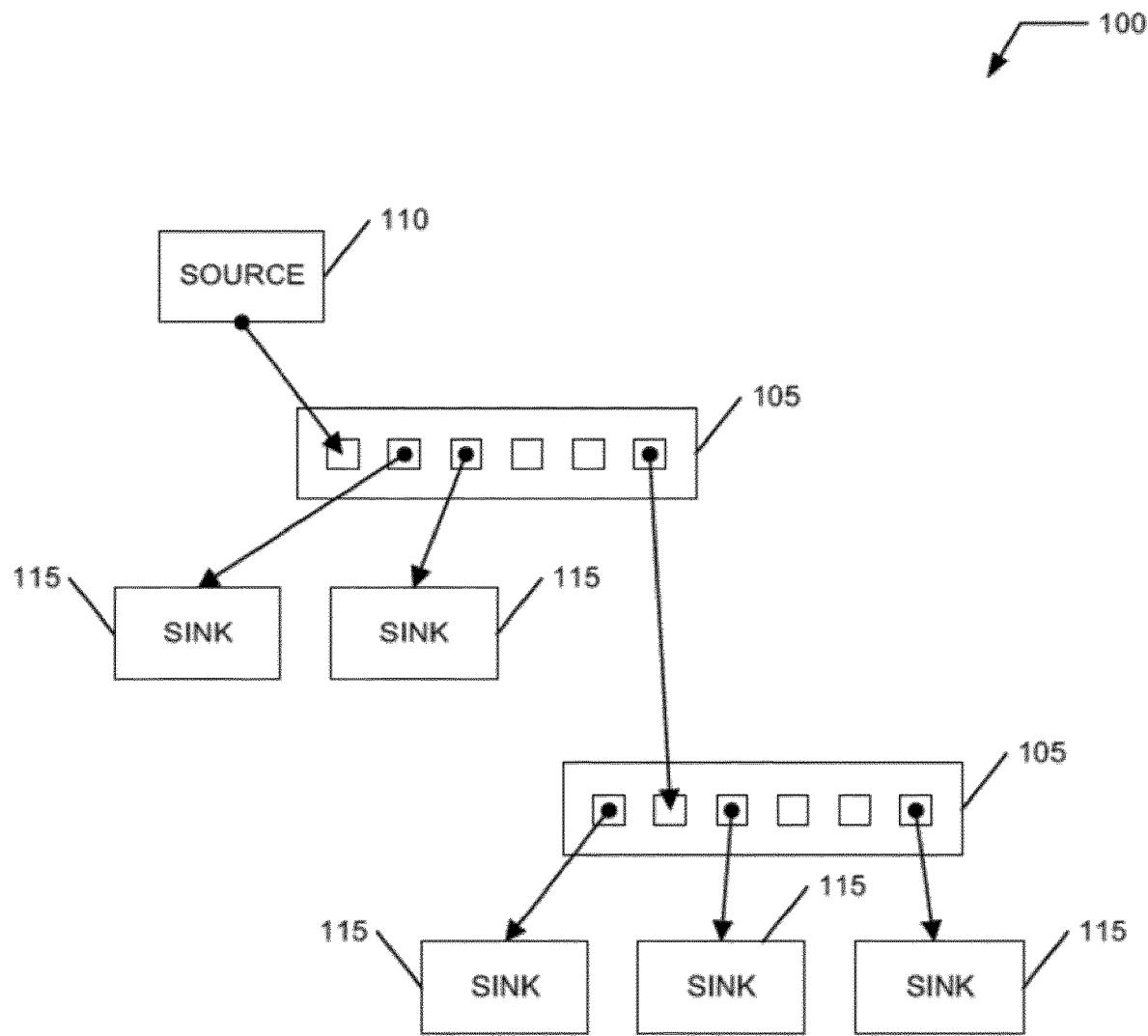
FIG. 1 illustrates an example of an Ethernet network.

Embodiments of the present invention provide a system and method for improving an effective streaming throughput capacity of a mesh network, for example in implementing an accurate reconstruction of DMX control (such as dimming). The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Definitions

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The following definitions apply to some of the aspects described with respect to some embodiments of the invention. These definitions may likewise be expanded upon herein.

As used herein, the term "or" includes "and/or" and the term "and/or" includes any and all combinations of one or more of the associated listed items. Expressions such as "at least one of," when preceding a list of elements, modify the entire list of elements and do not modify the individual elements of the list.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise. It will be understood that when an element is referred to as being "on" another element, it can be directly on the other element or intervening elements may be present there between. In contrast, when an element is referred to as being "directly on" another element, there are no intervening elements present.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking Coupled objects can be directly connected to one another or can be indirectly connected to one another, such as via an intermediary set of objects.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

FIG. 1 illustrates an example of an Ethernet network 100 in which a plurality of switches 105 retransmit, per standard, data from a data source 110 to a set of data sinks 115.

The transport of streaming data protocols (could be an industry standard protocol, such as Streaming ACN, ArtNet, DMX, or similar, but does not have to be) with few-to-many distribution is well suited for hardwired connection (such as Ethernet as illustrated in FIG. 1) where each possible datalink includes its own collision domain. Packets can easily be forwarded without collisions. Furthermore the amount of packets sent in the network is O(n) where n is the number of hardwired links between nodes (data sources, infrastructure nodes, data sinks).

In the Ethernet network of FIG. 1, source 110 need only to send one broadcast message to a first switch. This switch repeats that message to each of its (active) ports, and a second switch will do the same. Since each link is guaranteed to be its own collision domain and no collisions will occur, the messages does not need to be repeated.

Figure 2:
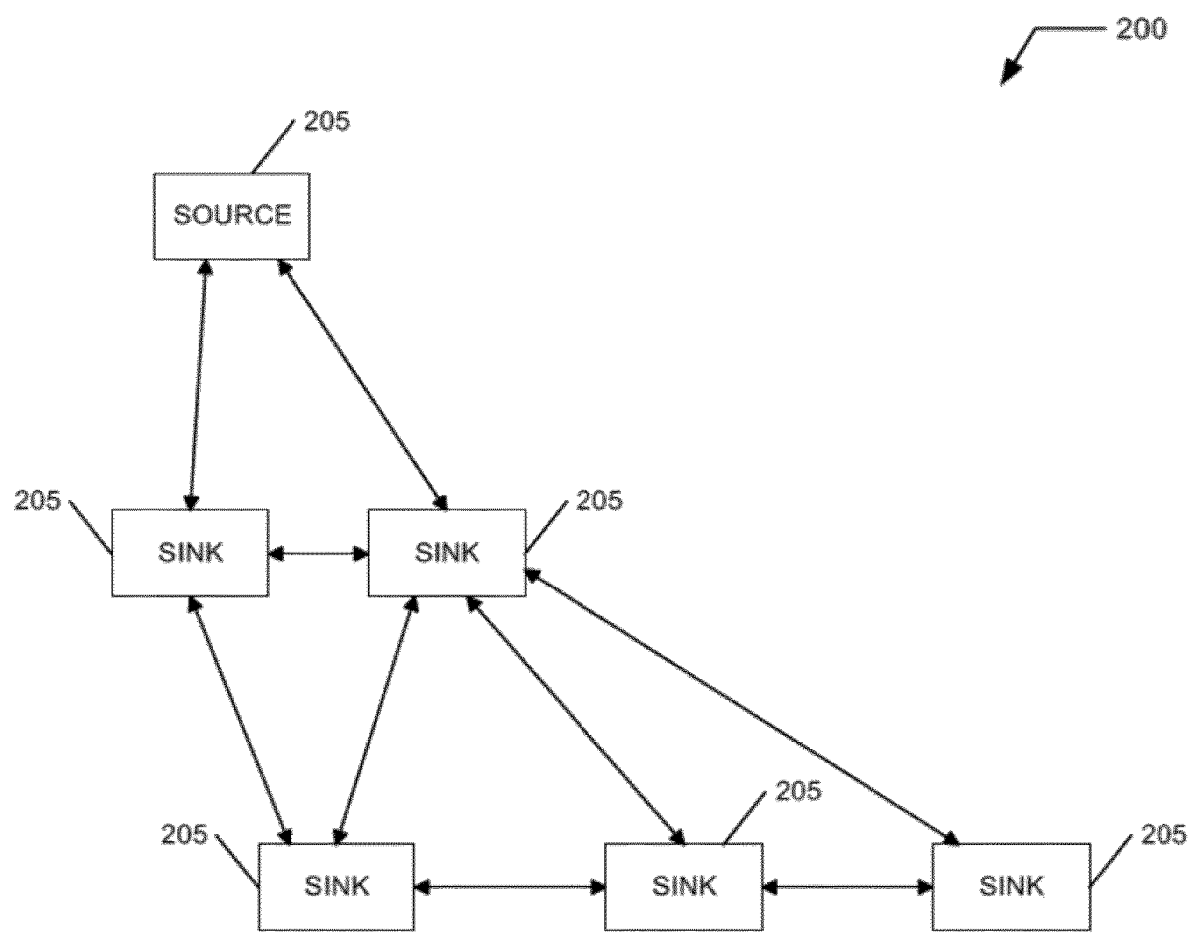
FIG. 2 illustrates an example of a wireless mesh network.

FIG. 2 illustrates an example of a wireless mesh network 200 in which multiple nodes 205 (some being a source and others may be a sink, and some may be intermediate retransmitting nodes) and links that share the same collision domain and the network has no defined physical hierarchy.

Each node 205 may need to help forwarding the messages so that it will reach all devices coupled to nodes 205 in network 200, each node 205 will receive the message multiple times and hence need to both: a) retransmit the message multiple times to handle collisions; and b) suppress retransmits to avoid/reduce flooding of network 200.

A propagation of broadcast messages in lossy wireless mesh networks such as network 200 may be solved using a trickle algorithm (IETF RFC6206: datatracker.ietf.org/doc/rfc6206/, hereby expressly incorporated by reference thereto for all purposes). There might be other similar algorithms.

However by the nature of broadcast flooding an amount of data going inside network 200 is multiplied from the input data of the streaming protocol being sent by the data source to the sinks. Furthermore these networks are made up of constrained devices, links are low data rate and lossy, and collisions occur. These factors results in the performance of the network not being sufficient to transport the streaming protocol to all data sinks with full refresh and/or sample rate as available at the original input data stream received at the source node 205.

By reducing an amount of samples being sent into the network by the source node to a sufficiently low level, with or without data compression, network performance could be made sufficient to transport the selected reduced "fidelity" samples which may sometimes be referred to herein as key frames or sample frames (these "frames" of samples can be called key frames).

However, for instance for an architectural lighting application, a user expects that fades from one color to another will be smooth. Unfortunately reducing the amount of samples in the data stream will be perceived as unwanted and unsatisfactory. This perception limits the commercial viability of using mesh networks for transmission of this type of data in this application, which then prevents anyone from enjoying the advantages of using a mesh network for the control application and other data streaming needs.

Figure 3:
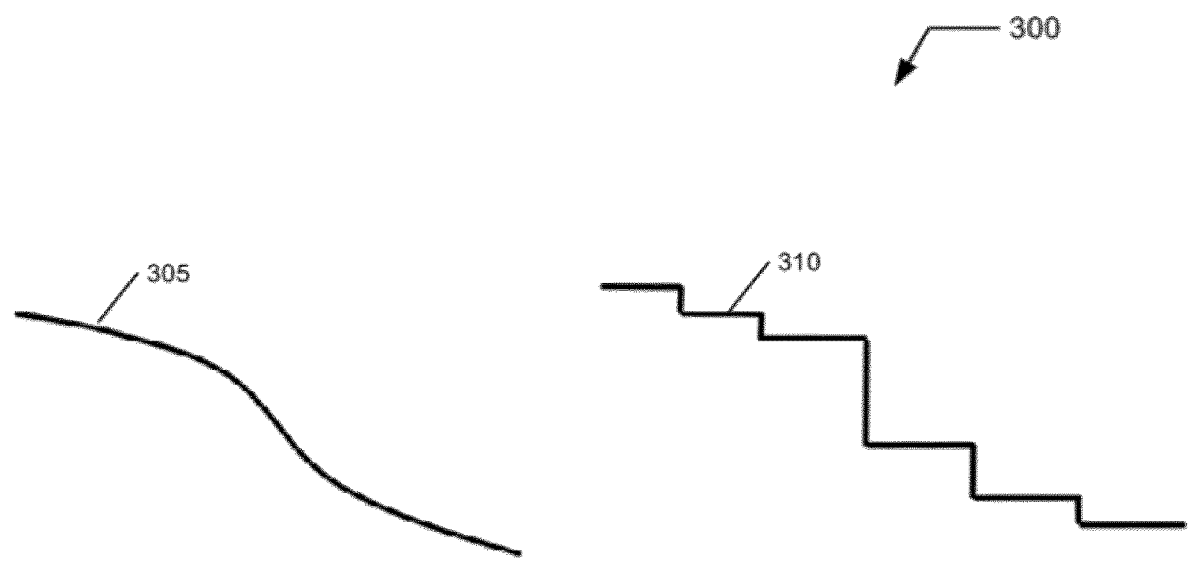
FIG. 3 illustrates a comparison of a commanded dimming versus a low-sample dimming at a sink node.

FIG. 3 illustrates a comparison 300 of a commanded dimming stream 305 versus a low-sample dimming stream 310 at a sink node. Commanded stream 305 provides a non-linear dimming curve from 100% to 0%. The sharp disjoint transitions in the low sample curve 310 will be perceived adversely by a user.

One may try to rectify this by implementing a solution that is commonly used in moving picture compression, such as MPEG. One may attempt to reduce an amount of key frames even further, and add transmissions of interstitial differences from one key frame to another, with a goal of only transmitting small packets of delta information.

This is believed to be less than ideal and may have a few drawbacks, including a) when deltas are dropped in the transmission, any errors will accumulate until a next key frame; and b) in wireless mesh networks, a number of packets that needs to be sent is a more limiting factor than the actual amount of data to be broadcasted, this makes the delta transmissions less meaningful and impactful.

That approach may be effective in some applications, it is believed for at least a data streaming application illustrated in FIG. 3, it may be preferred to receive a full input data stream into the border router/device of a mesh-type network, drop samples to produce a sample rate (amount of messages) that the mesh network can handle; and in the sinks reconstructing/producing a facsimile of the received data, such as through interpolation, produce a sufficiently close data stream in sink nodes as possible/necessary/desirable to the original data, or variation therefrom. Different interpolations may be used depending on the look of the input signal. One example is linear interpolation.

Figure 4:
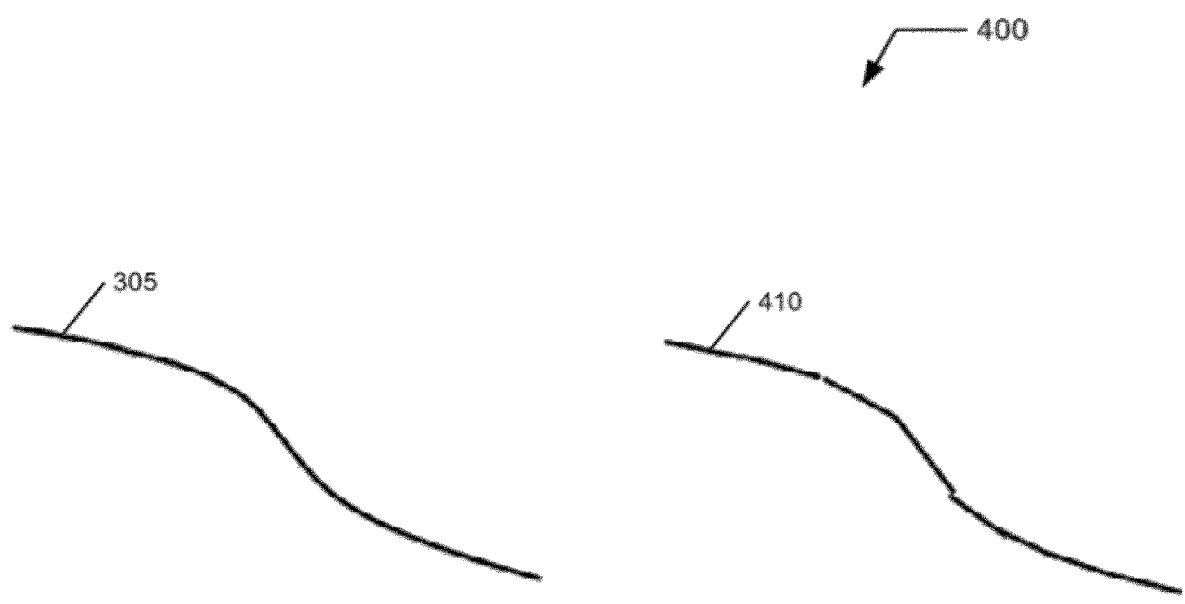
FIG. 4 illustrates a comparison of a commanded dimming versus a reconstruction at a sink node using a selected restoration mechanism.

FIG. 4 illustrates a comparison 400 of commanded dimming 305 (same as FIG. 3) versus a reconstruction stream 410 at a sink node using a selected restoration mechanism (e.g., linear interpolation).

Some embodiments of the present invention aim specifically at a system and a method for reducing sample rate of a streaming protocol for control, e.g. lighting control, at the data source (in the border of the network) and the reconstruction of said protocol (or similar protocol format) at the data sinks in wireless multi-hop networks. The reconstruction based upon operations using low data rate packets that are adequately handled by the mesh network and produce, such as by using additional signature parameters from the receiving node that define a selection/implementation of desired reconstruction modality.

The nodes may include stored program computing systems with one or more processors implementing computer instructions received from a memory to define the system and implement one or more of the methods described herein. Further, a node may include a processing system to receive key data and metadata and reconstruct a sufficiently accurate data stream from the key data and any metadata. Each node may further include any additional receivers for any out-of channel communication of metadata for any embodiments including such a feature.

Figure 5:
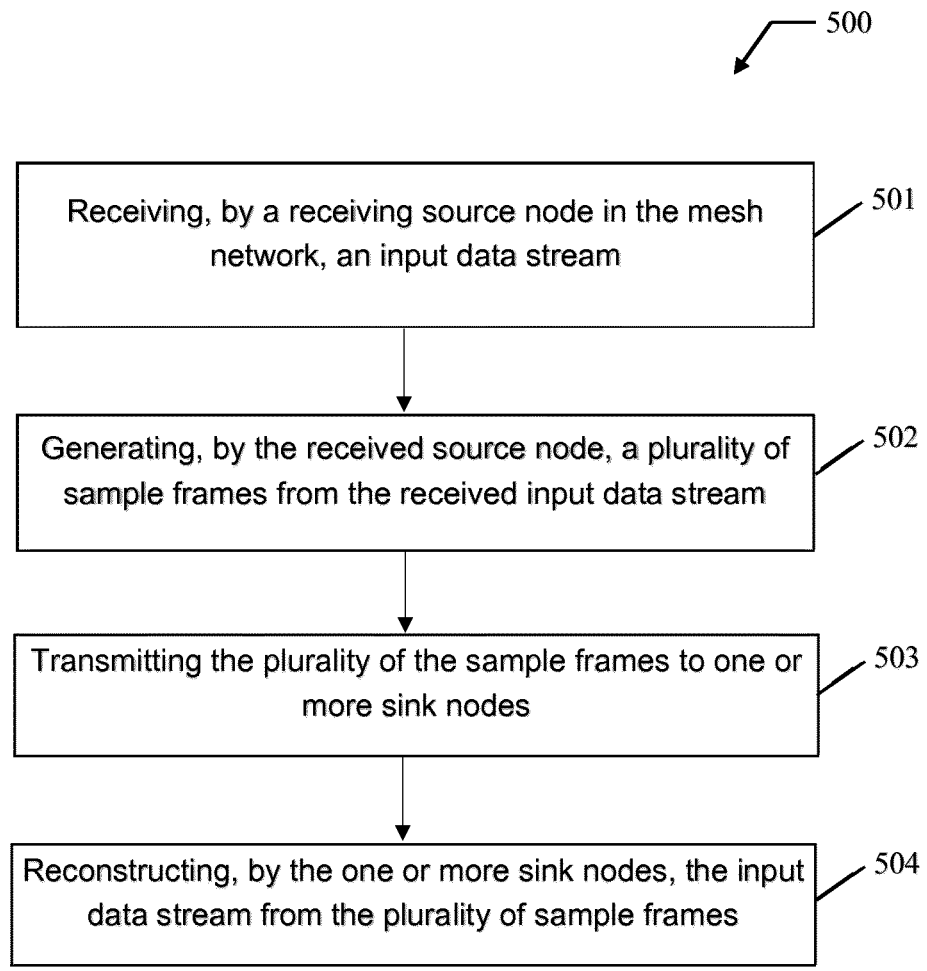
FIG. 5 illustrates a flow diagram of a method for reducing sampling rate in a mesh network, according to the present invention.

FIG. 5 illustrates a flow diagram of a method for reducing sampling rate in a mesh network, according to the present invention. The method comprises of receiving (501), by a source node in the mesh network, an input data stream, generating (502), by the source node, a plurality of sample frames from the received input data stream, each of the plurality of sample frames having a sample rate that can be handled by the mesh network, transmitting (503) the plurality of the sample frames to one or more sink nodes and reconstructing (504) of the input data stream from the plurality of sample frames. The source node transmits the plurality of sample frames to the one or more sink nodes along with a meta-data including one or more reconstruction parameters associated the input data stream. The reconstruction of the input data stream is performed through interpolation of the plurality of sample frames using the one or more reconstruction parameters included in the meta-data. The method further comprises selecting, by the one or more sink nodes, a reconstruction option to adjust the reconstruction of the input stream in a pattern that is different from the received input data stream.

According to some embodiment, the step of receiving the input data stream further comprising receiving the input data stream from an external application outside the mesh network. An example of an external application has been exemplified in connection with FIGS. 3 and 4.

According to some embodiment, the step of receiving the input data stream further comprising receiving the input data stream from an internal application in the source node. An example of an internal application is an audio conference system implemented in nodes, wherein an audio signal is generated in a source node and is transmitted to other nodes in the mesh network.

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The present invention is not limited to the embodiments described herein. Reference should be had to the appended claims.

The invention claimed is:

1. A method for reducing sample rate of a streaming protocol in a mesh network, the method comprising:
   receiving, by a source node in the mesh network, an input data stream;
   generating, by the source node, a plurality of sample frames from the received input data stream, each of the plurality of sample frames having a sample rate that can be handled by the mesh network;
   transmitting the plurality of sample frames to one or more sink nodes, for reconstruction of the input data stream; and
   selecting, by the one or more sink nodes, a reconstruction option to adjust the reconstruction of the input data stream in a pattern that is different from the received input data stream;
   wherein the source node transmits the plurality of sample frames to the one or more sink nodes along with a meta-data including one or more reconstruction parameters associated with the input data stream;
   wherein reconstruction of the input data stream is performed through interpolation of the plurality of sample frames using the one or more reconstruction parameters included in the meta-data.

2. The method of claim 1, wherein the interpolation is performed through one of a linear interpolation, a cubic spline interpolation, or any other interpolation formula.

3. The method of claim 1, wherein receiving the input data stream involves receiving the input data stream from an application outside the mesh network.

4. The method of claim 1, wherein receiving the input data stream involves receiving the input data stream from an application in the source node.

5. A wireless mesh network comprising:
   a source node; and
   one or more sink nodes;
   wherein the source node is adapted to
      receive an input data stream,
      generate a plurality of sample frames from the received input data stream, each of the plurality of sample frames having a sample rate that can be handled by the mesh network, and
      transmit the plurality of sample frames to the one or more sink nodes;
   wherein the source node transmits the plurality of sample frames to the one or more sink nodes along with a meta-data including one or more reconstruction parameters associated with the input data stream;
   wherein the one or more sink nodes is adapted to
      receive the plurality of sample frames transmitted from the source node, and
      reconstruct the input data stream from the plurality of sample frames;
   wherein reconstruction of the input data stream is performed through interpolation of the plurality of sample frames using the one or more reconstruction parameters included in the meta-data;
   wherein the one or more sink nodes is adapted to select a reconstruction option to adjust the reconstruction of the input data stream at a node in a manner that is different from the received input data stream.

6. The mesh network of claim 5, wherein the interpolation is performed through one of a linear interpolation, a cubic spline interpolation, or any other interpolation formula.

7. The mesh network of claim 5, wherein the source node is adapted to receive the input data stream from an application outside the mesh network.

8. The mesh network of claim 5, wherein the source node is adapted to receive the input data stream from an application in the source node.

9. A non-transitory computer-readable storage medium carrying a computer program, comprising instructions which, when executed on at least one processor, cause the at least one processor to carry out the method according to claim 1.

* * * * *